United States Patent [19]

Hjalmarsson

[11] Patent Number: 4,838,209
[45] Date of Patent: Jun. 13, 1989

[54] ENERGY PLANT WITH HEAT EXCHANGER IN A BLOW-OFF DEVICE FOR HOT GASES

[75] Inventor: Lennart Hjalmarsson, Finspong, Sweden

[73] Assignee: ABB Stal AB, Sweden

[21] Appl. No.: 181,505

[22] Filed: Apr. 14, 1988

[30] Foreign Application Priority Data

Apr. 14, 1987 [SE] Sweden .................................. 8701557

[51] Int. Cl.$^4$ ................................................ F22B 1/00
[52] U.S. Cl. ................................ 122/4 D; 60/39.02;
60/39.1; 60/39.25; 60/39.464
[58] Field of Search ............. 122/4 D; 60/39.1, 39.25,
60/39.464, 39.02

[56] References Cited

U.S. PATENT DOCUMENTS

| 4,306,411 | 12/1981 | Zoll | 60/39.46 S |
| 4,498,285 | 2/1985 | Kreij | 60/39.1 |
| 4,498,286 | 2/1985 | Brannstrom et al. | 60/39.25 X |
| 4,744,212 | 5/1988 | Andersson et al. | 60/39.02 |

*Primary Examiner*—Edward G. Favors
*Attorney, Agent, or Firm*—Pollock, Vande Sande & Priddy

[57] ABSTRACT

A PFBC power plant, with a vessel containing hot gas considerably exceeding the atmospheric pressure and a blow-off device for rapidly emptying a container containing the hot gas. The blow-off device comprises a heat exchanger which is located between the hot gas vessel and a valve in the blow-off device. Heat-absorbing material in the heat exchanger absorbs heat in the hot gas and reduces the temperature in the gas so as to protect the blow-off valve against thermal shock.

8 Claims, 1 Drawing Sheet

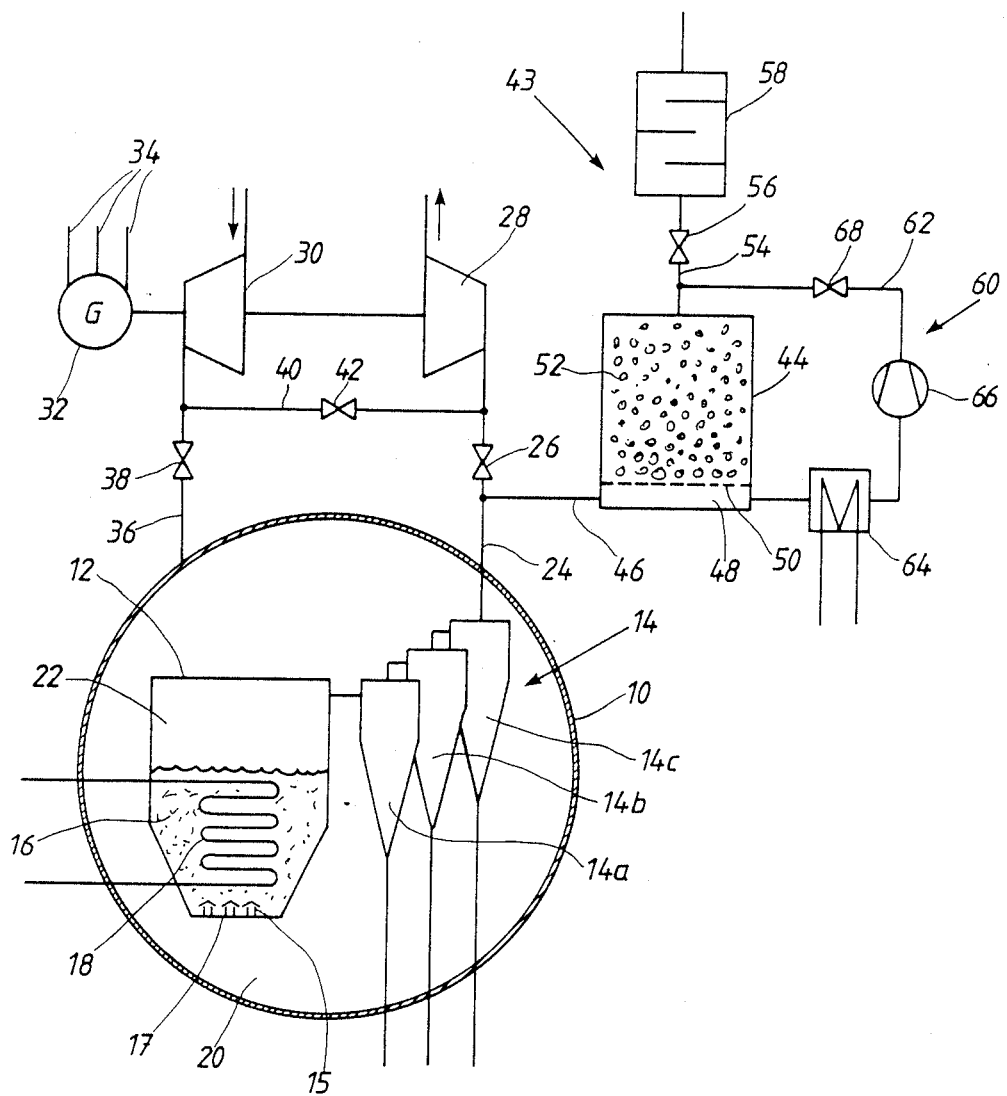

ENERGY PLANT WITH HEAT EXCHANGER IN A BLOW-OFF DEVICE FOR HOT GASES

BACKGROUND OF THE INVENTION

The present invention relates to a power plant with a blow-off device which permits rapid pressure reduction in a pressure vessel or combustion chamber with hot gas. It is particularly intended for a PFBC plant in which fuel is burnt in a fluidized bed of particulate material at a pressure considerably exceeding the atmospheric pressure. "PFBC" is formed of the initial letters in the English expression Pressurized Fluidized Bed Combustion. In such a plant a bed vessel and a cleaning plant are arranged within a pressure vessel. Combustion gases generated in the bed vessel drive a turbine. The turbine drives a compressor which delivers compressed combustion air to the pressure vessel.

In the event of an operational disturbance causing a gas turbine trip, the energy supply must be quickly interrupted to prevent the turbine from racing. By closing the valve in the hot gas conduit from the bed vessel and in the air conduit to the pressure vessel, the turbine and the compressor are isolated from the bed vessel and the pressure vessel, respectively. At the same time a valve in a by-pass conduit between the compressor and the turbine is opened.

U.S. patent application No. 007,226 U.S. Pat. No. 4,744,212 describes one way of slowly reducing the pressure in a combustion chamber and a pressure vessel in the case of a permanent disturbance.

However, in the case of a serious operational disturbance, it is desirable to have the possibility of rapidly achieving a blow-off of the hot gases in the plant. The high gas temperature, up to about 950° C., causes the blow-off valve to be subjected to great temperature stresses which damage the valves and result in the valves not being tight after closing after a blow-off. U.S. Pat. No. 4,498,285 to Kreij shows a valve arrangement for rapid blow-off of hot combustion gases in which combustion gas from a bed vessel is mixed with air from a surrounding pressure vessel with compressed combustion air upstream of a blow-off valve in the pressure vessel wall or in a blow-off conduit from the pressure vessel. Despite the temperature reduction ahead of the blow-off valve, the temperature stresses are considerable. Simultaneous opening of two valves, one from the combustion chamber and one from the pressure vessel, involves certain problems.

SUMMARY OF THE INVENTION

According to the present invention, the power plant comprises a blow-off device with a heat exchanger upstream of a blow-off valve. This heat exchanger may consist of a container containing heat-absorbing material with such a great total heat-absorbing capacity that the temperature of the gas passing through the valve at the end of the blow-off operation has been cooled to such a temperature that the valve is not damaged and seals completely after blow-off and closing. The heat capacity is suitably dimensioned such that the gas temperature after the heat exchanger is less than 300° C. at the end of the blow-off.

Heat-absorbing materials of different kinds can be used, for example sheets, rods or crushed rock or ore in the form of macadam with such a distribution that good filling can be obtained in a heat exchanger container and at the same time a relatively low flow resistance, thus obtaining a rapid blow-off. The heat exchanger can be provided with a cooler or a ventilating device for cooling the heat-absorbing material if it is considered necessary to rapidly cool down this material after a blow-off.

BRIEF DESCRIPTION OF THE DRAWING

The invention will be described in greater detail with reference to the accompanying drawing, the single FIGURE of which shows the present invention applied to a PFBC power plant.

DESCRIPTION OF THE PREFERRED EMBODIMENT

In the figure the numeral 10 designates a pressure vessel in which are positioned a bed vessel 12 and a cleaning plant 14 for cleaning of combustion gases from the bed vessel 12. The cleaning plant 14 is symbolized by three cyclones 14a, 14b, 14c arranged in series. Combustion of a fuel is performed in a fluidized bed 16 of particulate material. The bed 16 accomodates tubes 18 for generating steam for operation of a steam turbine (not shown). The space 20 contains compressed combustion air. From the space 20 the bed vessel 12 is supplied with air through the nozzles 15 at the bottom 17 of the bed vessel 12 for fluidization of the bed 16 and combustion of the fuel supplied to the bed 16. Combustion gases from the bed 16 which collect in the freeboard 22, are led to the cyclones 14a–14c and further through the conduit 24 with the valve 26 to the turbine 28. The turbine 28 drives a compressor 30 and a generator 32, which is connected to a network 34. Combustion air, compressed in the compressor 30, is led to the space 20 in the pressure vessel 10 through the conduit 36 with the valve 38. A by-pass conduit 40 with a valve 42 is arranged between the conduits 24 and 36.

The plant includes a blow-off device 43 with a heat exchanger 44. At its upstream side the heat exchanger 44 is connected by means of the conduit 46 to the conduit 24 which transports the hot combustion gases from the bed vessel 12 to the turbine 28. The conduit 46 opens out into the space 48 below the perforated bottom 50, which supports a heat-absorbing lump material 52. At its downstream side the heat exchanger 44 is connected to the outlet conduit 54. This conduit 54 includes a valve 56 and a noise suppressor 58.

To the heat exchanger 44 there is connected a coolant circuit 60 with a conduit 62 which is connected to the space 48 and the conduit 54, respectively. This coolant circuit conduit 62 comprises a cooler 64, a fan or compressor 66 and a cut-off valve 68. With the aid of the coolant circuit 60, the material 52 in the heat exchanger 44 can be cooled.

In operation, the valves 26 and 38 in the conduits 24 and 36, respectively, are open. Upon a load drop out when separating the generator 32 from the network 34, the energy supply to the turbine 28 must be rapidly limited to prevent the turbine 28 from racing so that the permissible speed is exceeded. The valves 26 and 38 are closed and the valve 42 in the by-pass conduit 40 is opened so for a direct communication between the compressor 30 and the gas turbine 28.

In the event of a permanent fault upon a gas turbine trip or other faults which necessitate putting the plant rapidly out of operation, the hot gases in the plant can be blown off by opening the valve 56 in the conduit 54. Upon the passage of the gases through the heat-absorbing material 52 in the heat exchanger 44, they are cooled down so that the valve 56 will not be subjected to thermal stresses jeopardizing its sealing effect. After a blow-off, the heat exchanger 44 is cooled. It can be cooled by the surrounding air. The cooling of the heat-absorbing material 52 becomes slow, which can be accepted in many cases. If rapid cooling is desired, gas can be circulated through the heat-absorbing material 52 and the coolant circuit 60 shown in the figure. The valve 68 and the fan or compressor 66 circulate gas through the conduit 62, the heat exchanger 44 and the cooler 64. The cooler 64 can be cooled by air or water.

I claim:

1. A power plant comprising:
    a vessel in a PFBC power plant generating hot propellant gas for a gas turbine at a pressure considerably exceeding the atmospheric pressure;
    means for rapid de-pressurization of the vessel by blowing off the hot gas through a blow-off device having a blow-off valve in a drain line communicating with said vessel; and
    a heat exchanger in said drain line, said heat exchanger having a lump-formed, rod-formed or plate-formed heat-absorbing material ahead of said blow-off valve, said heat-absorbing material cooling said hot gas during blowing when depressurizing said vessel.

2. A power plant according to claim 1 wherein said vessel is a combustor chamber.

3. A power plant according to claim 1 wherein said heat absorbing material includes a heap crushed rock with such a distribution of size that between pieces of the material the gas flow resistance is small.

4. A power plant according to claim 2 wherein said heat absorbing material includes crushed ore with such a distribution of size that between pieces of material, the gas flow resistance is small.

5. A power plant according to claim 1 wherein said heat exchanger comprises a container having a perforated gas distribution plate dividing the container into a lower gas plenum and an upper heat-absorbing material space, with said plate supporting said heat-absorbing material.

6. A power plant according to claim 4 wherein said heat exchanger comprises a container having a perforated gas distribution plate dividing the container into a lower gas plenum and an upper heat-absorbing material space, with said plate supporting said heat-absorbing material.

7. A power plant according to claim 5 wherein said heat exchanger is provided with a cooling circuit having a gas cooler and a gas circulator communicating with said gas plenum, said material space for removing heat from the heat absorbing material after a blow-off of the hot gases.

8. A power plant according to claim 6 wherein said heat exchanger is provided with a cooling circuit having a gas cooler and a gas circulator communicating with said gas plenum, said material space for removing heat from the heat absorbing material after a blow-off of the hot gases.

* * * * *